United States Patent
Xu

(10) Patent No.: US 10,215,856 B1
(45) Date of Patent: Feb. 26, 2019

(54) TIME OF FLIGHT CAMERA

(71) Applicant: Microsoft Technology Licensing, LLC, Redmond, WA (US)

(72) Inventor: Zhanping Xu, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/822,237

(22) Filed: Nov. 27, 2017

(51) Int. Cl.
| | |
|---|---|
| G01S 17/36 | (2006.01) |
| G01S 17/89 | (2006.01) |
| G01S 7/491 | (2006.01) |
| G01S 7/497 | (2006.01) |
| H04N 5/225 | (2006.01) |
| H04N 5/235 | (2006.01) |

(52) U.S. Cl.
CPC .......... *G01S 17/36* (2013.01); *G01S 7/497* (2013.01); *G01S 7/4915* (2013.01); *G01S 17/89* (2013.01); *H04N 5/2256* (2013.01); *H04N 5/2354* (2013.01)

(58) Field of Classification Search
CPC ........ G01S 17/36; G01S 7/4915; G01S 17/89; G01S 7/497; H04N 5/2354; H04N 5/2256
See application file for complete search history.

(56) References Cited

U.S. PATENT DOCUMENTS

| | | | |
|---|---|---|---|
| 3,704,465 A | 11/1972 | Masak et al. | |
| 8,363,927 B2 | 1/2013 | Rutschmann et al. | |
| 8,587,771 B2 | 11/2013 | Xu et al. | |
| 9,325,920 B2 | 4/2016 | Van Nieuwenhove et al. | |
| 9,329,035 B2 | 5/2016 | Oggier | |
| 9,405,008 B2 | 8/2016 | Raskar et al. | |
| 9,435,891 B2 | 9/2016 | Oggier | |
| 9,442,186 B2 | 9/2016 | Payne et al. | |
| 9,482,514 B2 | 11/2016 | Bridges | |
| 9,542,749 B2 | 1/2017 | Freedman et al. | |
| 2012/0033045 A1 | 2/2012 | Schweizer et al. | |
| 2014/0049767 A1 | 2/2014 | Benedetti et al. | |
| 2014/0340569 A1 | 11/2014 | Raskar et al. | |
| 2015/0193938 A1* | 7/2015 | Freedman | G01S 17/36 382/154 |

(Continued)

FOREIGN PATENT DOCUMENTS

| | | |
|---|---|---|
| WO | 2015133910 | 9/2015 |
| WO | 2016149438 | 9/2016 |

(Continued)

OTHER PUBLICATIONS

Lefloch, et al., "Technical Foundation and Calibration Methods for Time-of-Flight Cameras", In Time-of-Flight and Depth Imaging. Sensors, Algorithms, and Applications, vol. 8200, Sep. 23, 2013, pp. 3-24.

(Continued)

*Primary Examiner* — Gevell V Selby

(57) ABSTRACT

A method for determining whether a distance that a CW-TOF range camera provides for a scene is degraded by multipath interference (MPI) comprising operating the camera to determine a propagation phase delay and a phase delay coefficient for each of a plurality of modulation frequencies of light that illuminates the scene and using the phase delay coefficient and/or the phase delay to determine whether a distance provided by the camera is compromised by MPI.

20 Claims, 3 Drawing Sheets

(56) References Cited

U.S. PATENT DOCUMENTS

2015/0253429 A1\* 9/2015 Dorrington ............. G01S 17/89
 356/5.01
2016/0005179 A1 1/2016 Petyushko et al.
2016/0334509 A1\* 11/2016 Gruenwald ........ G06K 7/10089

FOREIGN PATENT DOCUMENTS

WO 2016171913 10/2016
WO 2017138032 8/2017

OTHER PUBLICATIONS

Bhandari, et al., "Resolving Multipath Interference in Kinect: An Inverse Problem Approach", In IEEE Sensors Journal, vol. 16, Issue 10, May 15, 2016, 4 pages.
Bhandari, et al., "Resolving Multi-path Interference in Time-of-Flight Imaging via Modulation Frequency Diversity and Sparse Regularization", In Journal of Optics Letters, vol. 39, Issue 06, Apr. 2014, pp. 1-11.
Dorrington, et al., "Separating true range measurements from multi-path and scattering interference in commercial range cameras", In Proceedings of the International Society for Optical Engineering, vol. 7864, Jan. 27, 2011, 10 Pages.
Klein, Jonathan, "Correction of Multipath-Effects in Time-of-Flight Range Data", In Master's thesis of University of Siegen, Jan. 6, 2014, 95 Pages.
Xu, Zhanping; U.S. Appl. No. 15/480,823, filed Apr. 6, 2017.

\* cited by examiner

US 10,215,856 B1

TIME OF FLIGHT CAMERA

BACKGROUND

A "continuous wave" time of flight (TOF) camera (CW-TOF), transmits a "continuous wave" of electromagnetic radiation, optionally infrared (IR) light, having intensity that is periodically modulated to illuminate a scene that the camera images. Light reflected from the transmitted light by a given feature in the scene reaches the camera as a wave of reflected light having a same modulation as the transmitted light but retarded in phase by a propagation phase delay, "$\varphi_d$", which is a function of a round trip time $t_R$ for light to propagate from the camera to the given feature and back to the camera, and thereby a distance, "d", to the feature. The camera images the light reflected by the given feature on a pixel of a photosensor for each of a plurality of exposure periods to accumulate electric charge, "photocharge" that the imaged light generates in the pixel during the exposure period. For each of the exposure periods, sensitivity of the photosensor to light is modulated at a different sampling phase offset relative to phase of modulation of light that the camera transmits. The amount of photocharge accumulated for a given sampling phase offset is proportional to a convolution of the exposure period associated with the sampling phase offset and the reflected light, and is a function of propagation phase delay $\varphi_d$ and the sampling phase offset. The CW-TOF camera processes the accumulated photocharges for the different sampling phase offsets to determine $\varphi_d$ and therefrom a distance, d, to the feature.

SUMMARY

An aspect of an embodiment of the disclosure relates to providing a CW-TOF camera configured to detect presence of multipath interference (MPI) in photocharge accumulated by pixels in the camera for features of a scene that the camera images on the pixels and thereby in phase delays $\varphi_d$, and distances d that the camera determines to the features. In an embodiment, the CW-TOF camera acquires a plurality of images of the scene, each image with illumination of the scene by light modulated at a different modulation frequency. The camera processes each of the images to determine an amplitude, and/or phase angle, and/or a function thereof associated with an amount of photocharge accumulated by each pixel for the feature it images. The camera compares the amplitudes and/or phase angles, and/or or functions thereof, determined for the pixel for at least two of the images to determine whether MPI generates error in an amount of photocharge that the pixel accumulates in imaging the feature.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

Figure 1:
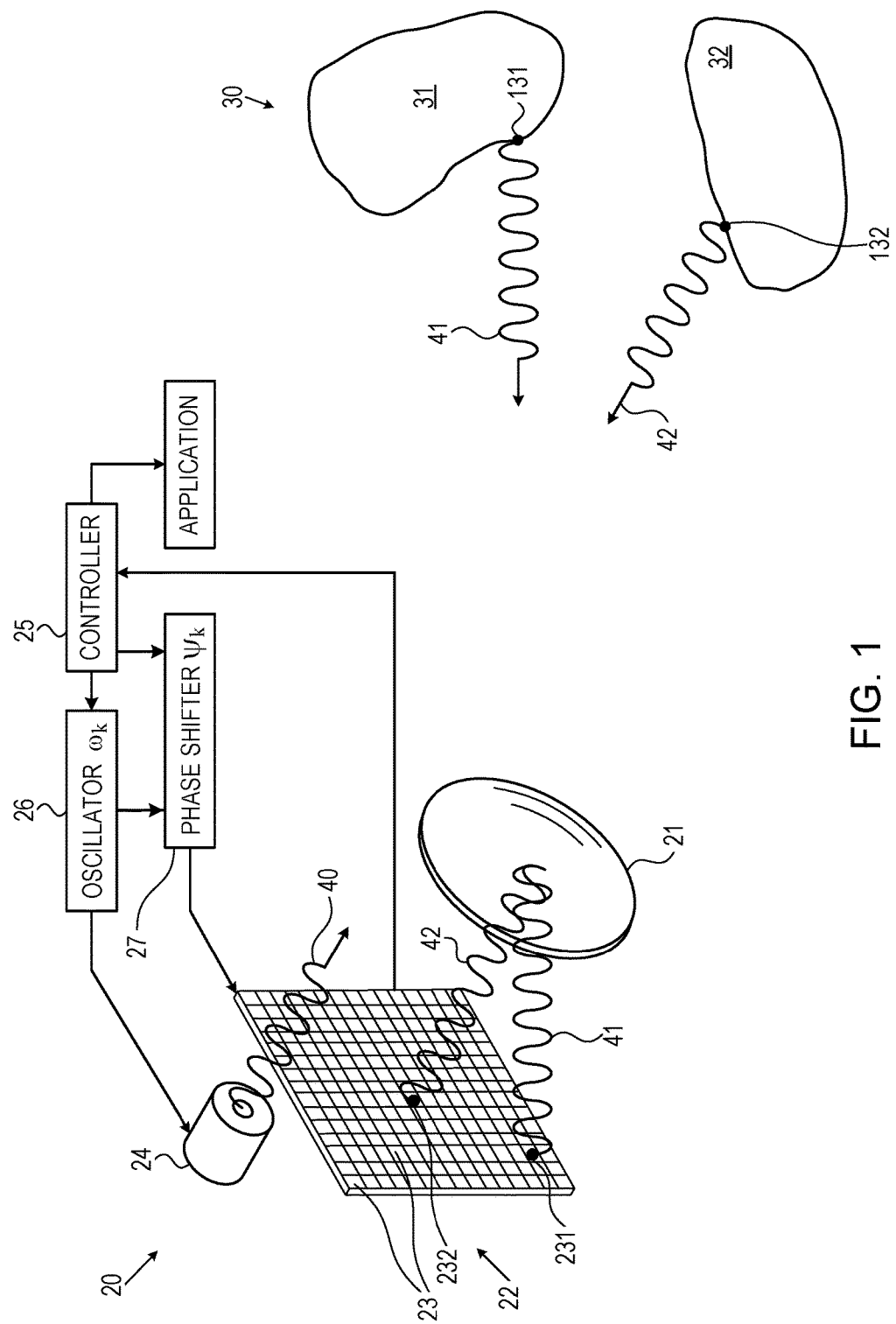
FIG. 1 schematically shows a CW-TOF camera determining distances to features in a scene in the absence of multipath interference (MPI) in accordance with an embodiment of the disclosure.

Reflected light from a given feature in a scene that a CW-TOF camera images on a photosensor pixel is not limited to "direct light" that propagates directly from the camera light source to the given feature and back to the camera. Reflected light from the given feature may have "bounced" to the given feature from another feature in the scene before being reflected by the given feature to the CW-TOF camera. The bounced light from the other feature travels a longer, multi-segment path, a "multipath", to the camera than direct light and therefore has a different, and larger propagation phase delay than direct light. Photocharge generated by multipath (MP) light incident on the pixel therefore contaminates photocharge generated by direct light incident on the pixel and generates error due to MPI in the phase delay $\varphi_d$ and distance d to the given feature that the camera determines.

In the discussion below operation of a CW-TOF camera is discussed with reference to FIG. 1 which illustrates the CW-TOF camera imaging a scene to acquire a range image of the scene in the absence of MPI. A range image comprises an image of a scene that provides distances to features in the scene or propagation phase delays from which the distances may be determined. FIG. 2 shows CW-TOF camera shown in FIG. 1 configured to detect presence of MPI in an image it acquired of a scene in accordance with an embodiment of the disclosure. FIG. 2 shows the CW-TOF camera imaging the same scene shown in FIG. 1 but in the presence of MPI. Effects of MPI on determination of propagation phase delays $\varphi_d$ and distances to features in the scene are discussed with reference to FIG. 2. FIG. 3 provides a flow diagram of a procedure for determining whether images of features in the scene provided by pixels in the CW-TOF are contaminated by MPI.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one, or any combination of more than one of the items it conjoins FIG. 1 schematically shows a CW-TOF camera 20 operating to determine distances to features in a scene 30 optionally comprising objects 31 and 32. CW-TOF camera 20, which is represented very schematically, comprises an optical system represented by a lens 21, and a photosensor 22 having an array of rows and columns of pixels 23 on which optical system 21 images features of scene 30. A given pixel 23 in photosensor 22 may be designated p(i,j), where "i" and "j" are indices that indicate a row and a column respectively of photosensor 22 in which the pixel is located. A feature in scene 30 that CW-TOF camera 20 images on a pixel p(i,j) may be referred to as a feature f(i,j), and/or by a reference label. CW-TOF camera 20 may comprise a light source 24, an oscillator 26, a phase shifter 27, and a controller 25 that controls components comprised in the CW-TOF camera.

To acquire a range image of scene 30, controller 25 controls CW-TOF camera 20 to acquire a plurality of K images of scene 30 each at a different sampling phase offset $\Psi_k$, ($1 \leq k \leq K$) of a plurality of K sampling phase offsets, where $\Psi_k$ is equal to $2\pi(k-1)/K$, and k and K are integers. For a k-th image of the K images, controller 25 controls oscillator 26 to provide a frequency signal having angular frequency $\omega_k$ and controls light source 24 to transmit light continuously modulated at the angular frequency provided by the oscillator. Light transmitted by light source 24 is schematically represented by a wavy line 40 having an arrow indicating direction of propagation of the transmitted light. While illuminating scene 30 with light 40, controller 25 turns on photosensor 22 for an exposure period "$Ex_k$" to register light that features in scene 30 reflect from transmitted light 40 back to camera 20 and optical system 21 images on pixels 23 of photosensor 22. During exposure period $Ex_k$ controller 25 modulates sensitivity of photosensor 22 at angular frequency $\omega_k$ provided by oscillator 26, but controls phase shifter 27 to shift the phase of modulation of the photosensor by sampling phase offset $\Psi_k$ relative to phase of modulation of transmitted light 40. Optionally, angular frequency $\omega_k$, unless otherwise indicated is the same for all values of k and is assumed for convenience of presentation equal to an angular frequency "$107$".

A pixel 23 in photosensor 22 registers light reflected from a feature in scene 30 that optical system 21 images on the pixel during exposure period $Ex_k$ by accumulating photocharge that the light generates in the pixel during the exposure period. By way of example, FIG. 1 schematically shows features 131 and 132 of objects 31 and 32 respectively, reflecting light from light 40 back to CW-TOF camera 20. Reflected light from feature 131 is schematically represented by a wavy line 41 having an arrow indicating direction of propagation of the light, which optical system 21 images on a pixel 23, p(i,j), designated pixel 231 in photosensor 22. An amount of photocharge that pixel 231 accumulates is proportional to a convolution of reflected light 41 with sensitivity exposure period $Ex_k$. The convolution is a function of sampling phase offset $\Psi_k$ and a propagation delay $\varphi_d(131)$ resulting from a round trip time $t_R$ for light to travel from light source 24 to feature 131 and back to CW-TOF camera 20. In symbols, $\varphi_d(131) = \omega t_R(131)$, where $t_R(131)$ is a round trip time for light to travel from light source 24 to feature 131 and back to the camera. Since $t_R(131)$ is equal to $2d(131)/c$, where $d(131)$ is the distance from CW-TOF camera 20 to feature 131 and c the speed of light, propagation phase delay $\varphi_d(131)$ is also equal to $2\omega d(131)/c$. Similarly, reflected light from feature 132, which is imaged by optical system 21 on a pixel 232, is schematically represented by a wavy line 42 and direction arrow, and an amount of photocharge that pixel 232 accumulates for feature 132 during exposure period $Ex_k$ is proportional to a convolution of reflected light 42 with the exposure period. The convolution is a function of sampling phase offset $\Psi_k$ and a propagation phase delay $\varphi_d(132) = 2\omega d$ (132)/c, which because feature 132 is indicated in FIG. 1 as closer to CW-TOF camera 20 than feature 131, is less than $\varphi_d(131)$.

At the end of each exposure period $Ex_k$, controller 25 reads photosensor 22 to acquire a frame of the photosensor for the sampling phase offset $\Psi_k$. The frame comprises voltages representing the accumulated photocharges and corresponding amounts of reflected light registered by pixels 23 in photosensor 22 during exposure period $Ex_k$ for features in scene 30 respectively imaged on the pixels. Controller 25 may process the voltages provided by the frames for all K sampling phase offsets $\Psi_k$, $1 \leq k \leq K$ to extract propagation phase delays $\varphi_d(i,j)$ for respective pixels p(i,j) of pixels 23 and associated distances d(i,j) for features f(i,j) imaged on pixels p(i,j) as discussed below. A frame of voltages of photosensor 22 that may be used to provide distances to features in a scene imaged by CW-TOF camera 20 may be referred to as a "voltage image" of the scene.

Transmitted light 40, reflected light, such as light 41 and 42 reflected from transmitted light 40 by features 131 and 132, and modulated sensitivity of pixels in photosensor 22 during an exposure period $Ex_k$ are periodic functions, and each may advantageously be expressed as a Fourier cosine series. Intensity of transmitted light 40 as a function of time during exposure period $Ex_k$ may therefore be represented by $$I_k(t) = \sum_0^\infty I_{k'_n} \cos(n\omega t), \tag{1}$$

and intensity of light reflected from light 40 by a feature f(i,j) in scene 30 that is imaged by CW-TOF camera 20 on a corresponding pixel p(i,j) of pixels 23 during exposure period $Ex_k$ may be represented by $$R_k(i, j, t) = \sum_0^\infty R(i, j)_{k'_n} \cos(n\omega t + n\varphi_d(i, j)). \tag{2}$$

If the sensitivity of pixels 23 in photosensor 22 during exposure period $Ex_k$ is represented by $$S_k(t) = \sum_0^\infty S_{k'_n} \cos(n\omega t + n\psi_k),$$

the convolution, $CV_k(i,j) \equiv S_k(t) * R_k(i,j,t)$, of $R_k(i,j,t)$ and $S_k(t)$ for pixel p(i,j) may be expressed, $$CV_k(i, j) \equiv S_k(t) * R_k(i, j, t) = \sum_0^\infty S_{k'_n} R(i, j)_{k'_n} \cos(n\psi_k + n\varphi_d(i, j). \tag{3}$$

Then, if $V_k(i,j)$ is a voltage in a frame of photosensor 22 representing an amount of photocharge accumulated by pixel p(i,j) during exposure period $Ex_k$ acquired following the exposure period, $V_k(i,j,\Psi_k)$ may be written, $$V_k(i, j, \psi_k) = \alpha CV_k(i, j) = \alpha \sum_0^\infty S_{k'_n} R(i, j)_{k'_n} \cos(n\psi_k + n\varphi_d(i, j)), \tag{4}$$

where $\alpha$ is a proportionality coefficient.

For intensity of transmitted light characterized by a single dominant modulation frequency and/or for which harmonics of the dominant frequency may advantageously be ignored, transmitted light 40 may be approximated by an expression, $$I_k(t) = \sum_0^\infty I_{k'n} \cos(n\omega t) \cong I_O + I_1 \cos\omega t, \quad (5)$$

and light from a feature f(i,j) in scene 30 imaged on a pixel p(i,j) advantageously approximated by an expression, $$R_k(i, j, t) = \quad (6)$$
$$\sum_0^\infty R(i, j)_{k'n} \cos(n\omega t + n\varphi_d(i, j)) \cong R_O + R_1(i, j) \cos(\omega t + \varphi_d(i, j)).$$

Assuming that modulation of sensitivity of photosensor 22 during an exposure period $Ex_k$ may be expressed, $$S_k(t) = \sum_0^\infty S_{k'n} \cos(n\omega t + \psi_k) \cong S_O + S_1 \cos(\omega t + \psi_k), \quad (7)$$

the convolution of exposure period $Ex_k$ and light $R_k(i,j,t)$ reflected by a feature f(i,j) in scene 30 and imaged on a pixel 23 p(i,j) becomes, $$CV_k(i,j) = S_o R(i,j)_o + S_1 R(i,j)_1 \cos(\Psi + \varphi_d(i,j)). \quad (8)$$

Voltage representing the photocharge accumulated by p(i,j) during the exposure period, $$V_k(i,j,\Psi_k) = \alpha CV_k(i,j) = \alpha[S_o R(i,j) + S_1 R(i,j)_1 \cos(\Psi_k + \varphi_d(i,j))], \quad (9)$$

which may be written in a form, $$V_k(i,j,\Psi_k) = A(i,j) + B(i,j) \cos(\Psi_k + \varphi_d(i,j)). \quad (10)$$

$A(i,j)$ may be referred to as a bias, and $B(i,j)$ as a phase delay coefficient.

Controller 25 may determine propagation phase delay $\varphi_d(i,j)$ for a feature f(i,j) imaged on pixel p(i,j) in accordance with an expression, $$\varphi_d(i, j) = \operatorname{atan}\left[-\sum_{k=1}^{k=K} V_k(i, j, \psi_k)\sin(\psi_k) \Big/ \sum_{k=1}^{k=K} V_k(i, j, \psi_k)\cos(\psi_k)\right] = \quad (11)$$
$$\operatorname{atan}\left[-\sum_{k=1}^{k=K} B(i, j)\cos(\psi_k + \varphi_d(i, j))\sin(\psi_k) \Big/ \sum_{k=1}^{k=K} B(i, j)\cos(\psi_k + \varphi_d(i, j))\cos(\psi_k)\right]$$

and distance d(i,j) to feature f(i,j) in accordance with, $$d(i,j) = [c/2\Psi]\varphi_d(i,j). \quad (12)$$

By way of specific example, for feature 131 of object 31 that CW-TOF camera 20 images on pixel 231, controller 25 may determine a propagation phase delay $$\varphi_d(231) = \operatorname{atan}\left[-\sum_{k=1}^{k=K} V_k(231, \psi_k)\sin(\psi_k) \Big/ \sum_{k=1}^{k=K} V_k(231, \psi_k)\cos(\psi_k)\right], \quad (13)$$

and distance to the feature, $$d(131) = [c/2\omega]\varphi_d(231). \quad (14)$$

The discussion above referencing features in FIG. 1A assumes absence of MPI and that therefore amounts of photocharge accumulated by pixels 23 during an exposure period $Ex_k$ are generated only by light reflected by features in scene 30 from direct light, that is, light that reaches the features directly from light source 24. However, in general, accumulation of photocharge by pixels in a CW-TOF camera is generally contaminated by photocharge generated by MP light.

FIG. 2 by way of example schematically shows a CW-TOF camera 200 similar to CW-TOF imaging scene 30 in the presence of MPI and illustrates how MPI may affect photocharge accumulated by pixel 231 on which CW-TOF camera 200 images reflected light from feature 131 during an exposure period $Ex_k$ of photosensor 22. CW-TOF camera 200 optionally comprises same components as CW-TOF camera 20 but comprises a controller 225 in place of controller 25. Controller 225 is configured to control CW-TOF camera 200 to acquire a range image of scene 30 and provide an indication as to which pixels 23 in the camera provide images of features in the scene that are degraded by MPI. Controller 225 of CW-TOF camera 200 may comprise any electronic and/or optical processing and/or control circuitry, to provide and enable functionalities that the camera may require to support range imaging and detection of MPI in accordance with an embodiment of the disclosure. By way of example, controller 225 may comprise any one, or any combination of more than one of, a microprocessor, an application specific circuit (ASIC), field programmable array (FPGA) and/or system on a chip (SOC). The controller may comprise a memory having any electronic and/or optical circuitry suitable for storing data and/or computer executable instructions and may, by way of example, comprise any one or any combination of more than one of a flash memory, random access memory (RAM), read only memory (ROM), and/or erasable programmable read-only memory (EPROM).

FIG. 2 schematically shows that some of light 40 transmitted by light source 24 and incident on feature 132 as well as, by way of example, features 132(1) and 132(2) of object 32 is not reflected directly back to CW-TOF camera 20 for imaging the features, but is instead reflected to illuminate feature 131. Light reflected from features 132, 132(1), and 132(2) to illuminate feature 131 is MP light, having traveled multiple distinct path segments from light source 24 to feature 131, and is represented by dashed wavy lines 42*, 132(1)*, and 132(2)* respectively. Some of MP light 42*, 132(1)*, and 132(2)* that is incident on feature 131 is reflected by feature 131 to CW-TOF camera 20 and is imaged on pixel 231 together with direct light from light source 24 reflected by the feature.

Figure 2:
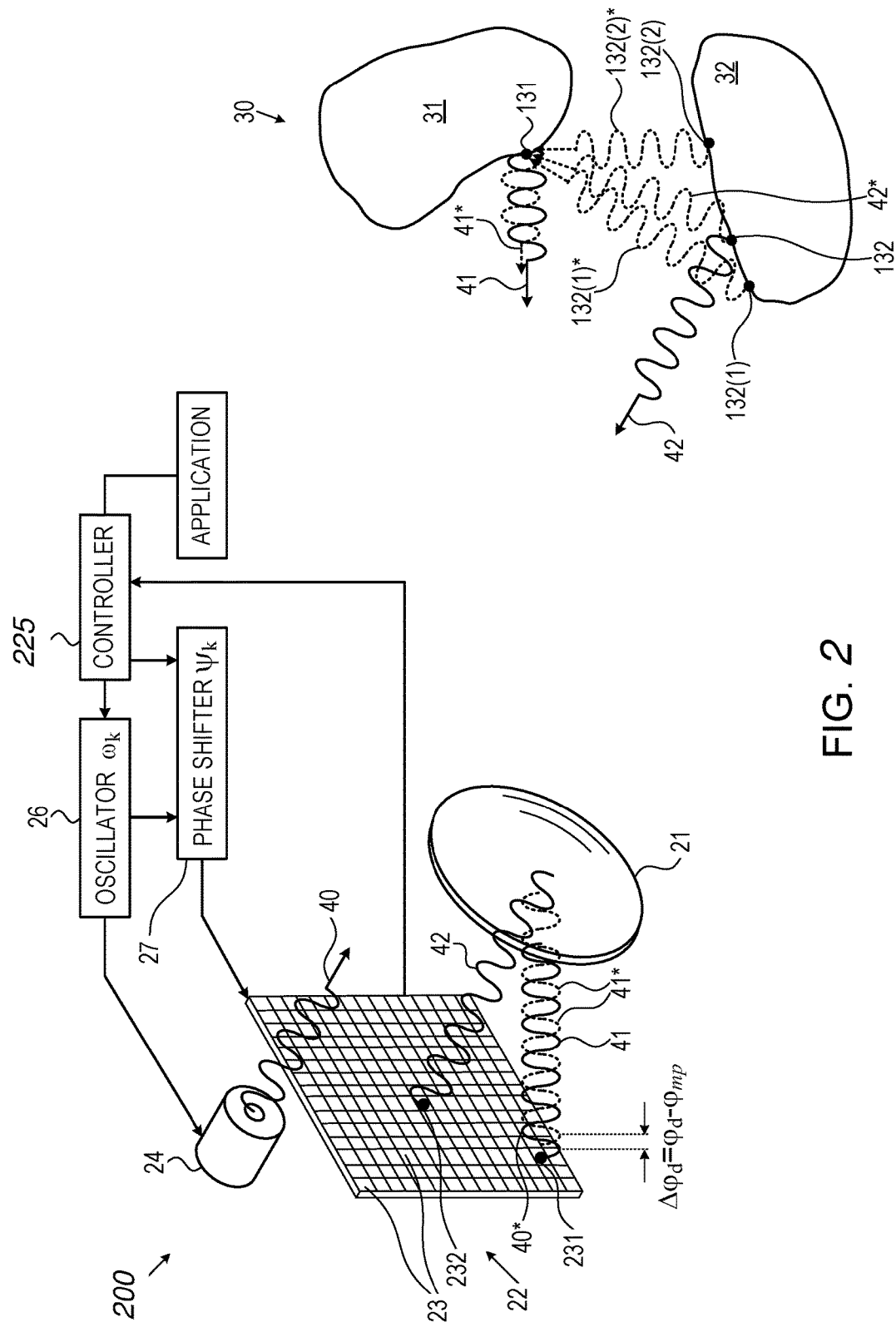
FIG. 2 schematically shows the CW-TOF camera shown in FIG. 1 determining distances to features in the scene in the presence of MPI, in accordance with an embodiment of the disclosure.
Figure 3:
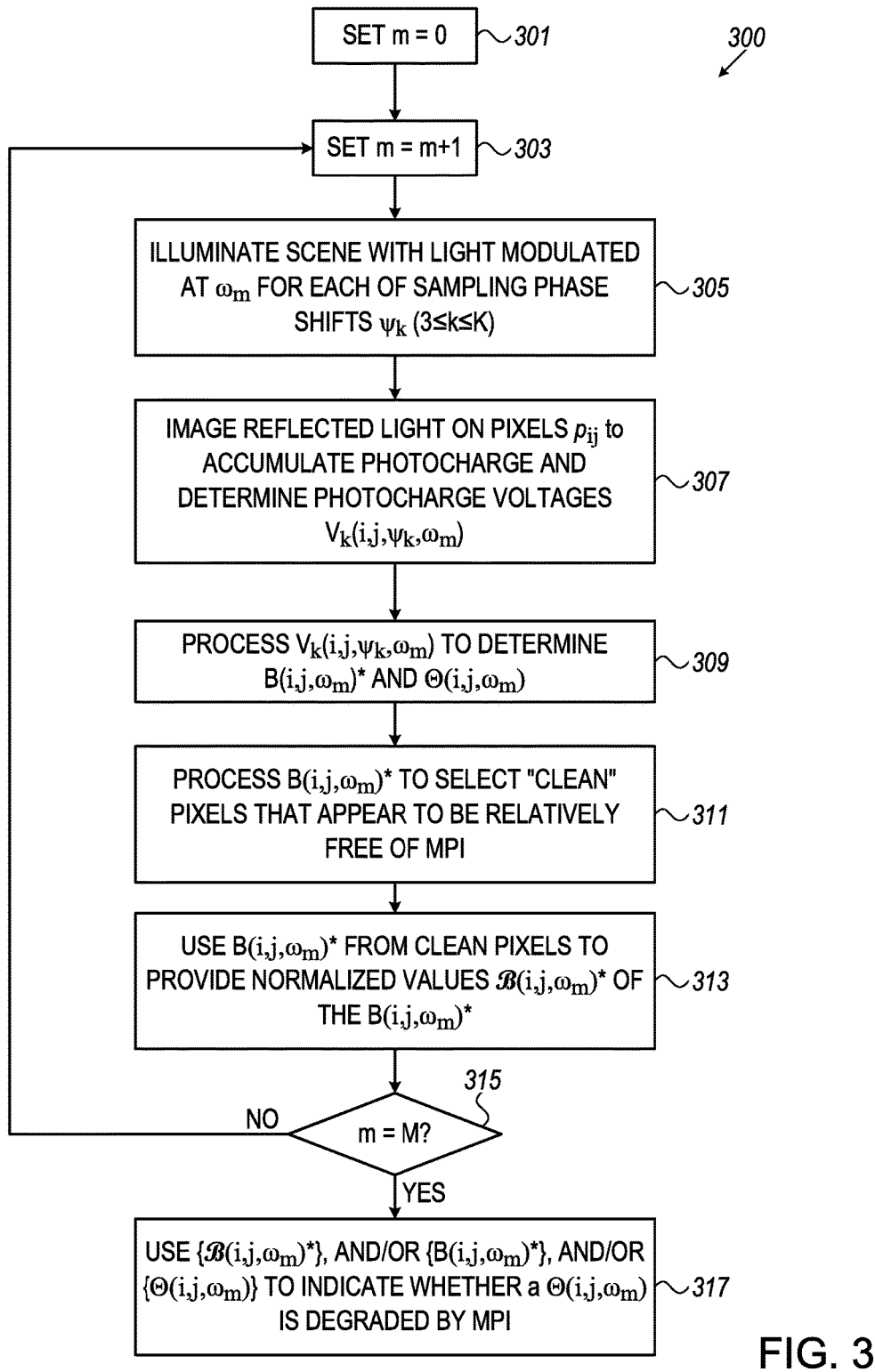
FIG. 3 shows a flow diagram of a method of determining whether an image provided by the CW-TOF camera shown in FIG. 2 is contaminated by MPI, in accordance with an embodiment of the disclosure.

Light reflected by feature 131 from transmitted light 40 that directly illuminates feature 131 that CW-TOF camera 20 images on pixel 231 is represented in FIG. 2, as in FIG. 1, by light 41. Whereas MP light 42*, 132(1)*, and 132(2)* travel different multipaths from light source 24 to feature 131 and light from each multipath that is reflected by feature 131 to CW-TOF camera 20 reaches pixel 231, generally with a different propagation phase delay, the MP light reflected by feature 131 is, for convenience of presentation, collectively represented in FIG. 2 by a same dashed wavy line 41*. Light 41* is shown displaced back of light 41 in FIG. 2 to indicate that reflected MP light 41* is retarded by propagation phase delay greater than a propagation phase delay characterizing direct light 41.

Assume that a given feature f(i,j) in scene 30 that CW-TOF camera 20 images on pixel p(i,j) receives MP light reflected from transmitted light 40 by features f(i',j') in the scene for which i'≠i, or j'≠j. When feature f(i,j) reflects the MP light it receives to CW-TOF camera 20 during an exposure period $Ex_k$, the reflected MP light contributes to photocharge accumulated by pixel p(i,j) during the exposure period, and thereby to voltage $V_k(i,j,\Psi_k)$ representing the accumulated photocharge. Since photocharge generated in a photosensor pixel p(i,j) by light incident on the pixel is generally a linear function of the incident light, an amount of photocharge accumulated by pixel p(i,j) during exposure period $Ex_k$, is a sum of photocharge generated by reflected direct light and reflected MP light incident on the pixel. By way of example, for feature 131 shown in FIG. 2 photocharge generated in pixel 231 by incident light during an exposure period $Ex_k$ may be a sum of photocharge generated by reflected direct light 41 and reflected MP light 41*. Reflected light 41*, as noted above, includes light reflected from MP light 132(1)*, 132(2)* and 41* reaching feature 131 from features 132(1), 132(2) and 132 respectively.

Therefore, for feature f(i,j) imaged by CW-TOF camera 20 on pixel p(i,j), voltage $V_k(i,j,\Psi_k)$ representing photocharge accumulated by the pixel during exposure period $Ex_k$ is a sum of a voltage, $V_k(i,j,\Psi_k)_D$, representing photocharge accumulated responsive to direct light that f(i,j) reflects and CW-TOF camera 20 images on p(i,j), and a voltage, $V_k(i,j,\Psi_k)_{MP}$, representing photocharge, "MP photocharge", accumulated responsive to MP light that f(i,j) reflects and the camera images on pixel p(i,j). Voltage $V_k(i,j,\Psi_k)$ may therefore be given by an expression $$V_k(i,j,\Psi_k) = V_k(i,j,\Psi_k)_D + V_k(i,j,\Psi_k)_{MP} \quad (15)$$

In expression (15), $V_k(i,j,\Psi_k)_D$ is given by expression (10) above and may be written, $$V_k(i,j,\Psi_k)_D = [A(i,j) + B(i,j)\cos(\Psi_k + \varphi_d(i,j))] \quad (16)$$

Voltage $V_k(i,j,\Psi_k)_{MP}$ may similarly be given by an expression $$V_k(i,j,\Psi_k)_{MP} = \Sigma_{i'j'}[A_{MP}(i,j,i',j') + B(i,j,i',j')_{MP}\cos(\Psi_k + \varphi_d(i,j,i',j'))], \quad (17)$$

where the sum in expression (17) is taken over indices of features f(i',j') that illuminate feature f(i,j) with MP light during exposure period $Ex_k$. The phase $\varphi_d(i,j,i',j')$ in (17) is a propagation phase delay that MP light from feature f(i',j') experiences in propagating from CW-TOF camera 20 to f(i',j'), from f(i',j') to f(i,j), and from f(i,j) back to CW-TOF camera 20.

It is readily seen from expression (17) that MP light adds photocharge to photocharge generated by direct light reflected from feature f(i,j) and generates error in voltage $V_k(i,j,\Psi_k)$ and thereby in propagation phase delay $\varphi_d(i,j)$ and distance d(i,j) to feature f(i,j) that CW-TOF camera 20 may determine based on the propagation phase delay.

To determine how presence of MPI in distance measurements provided by CW-TOF camera 200 may generate error in the distance measurements, expression (15) may be rewritten in accordance with an embodiment of the disclosure to explicitly exhibit components of $V_k(i,j,\Psi_k)_D$ and $V_k(i,j,\Psi_k)_{MP}$ as shown in expressions (16) and (17) so that, $$V_k(i,j,\Psi_k) = [A(i,j) + \Sigma_{i'j'}A_{MP}(i,j,i',j')] + B(i,j)\cos(\Psi_k\varphi_d(i,j)) + \Sigma_{i'j'}[B(i,j,i',j')]. \quad (18)$$

Letting $$A^*(i,j) = A(i,j) + \Sigma_{i'j'}[A_{MP}(i,j,i',j')]; \quad (19)$$

$$\Delta\varphi(i,j,i',j') = \varphi_d(i,j,i',j') - \varphi_d(i,j); \quad (20)$$

and $$r(i,j,i',j') = B(i,j,i',j')_{MP}/B(i,j); \quad (21)$$

expression (18) becomes $$V_k(i,j,\Psi_k) = A^*(i,j) + B(i,j)[\cos(\Psi_k + \varphi_d(i,j)) + \Sigma_{i'j'}r(i,j,i',j')\cos(\Psi_k + \varphi_d(i,j) + \Delta\varphi(i,j,i',j'))]. \quad (22)$$

Noting that $$\Sigma_{i'j'}r(i,j,i',j')\cos(\Psi_k\varphi_d(i,j) + \Delta\varphi(i,j,i',j')) = \Sigma_{i'j'}r(i,j,i',j')\{\cos(\Psi_k + \varphi_d(i,j))\cos\Delta\varphi(i,j,i',j') - \sin(\Psi_k + \varphi_d(i,j))\sin\Delta\varphi(i,j,i',j')\}, \quad (23)$$

expression (22) may be expressed as:

$$V_k(i,j,\Psi_k) = A^*(i,j) + B(i,j)[(1 + \Sigma_{i'j'}r(i,j,i',j')\cos\Delta\varphi(i,j,i',j'))\cos(\Psi_k + \varphi_d(i,j)) - \Sigma_{i'j'}r(i,j,i',j')\sin\Delta\varphi(i,j,i',j')\sin(\Psi_k + \varphi_d(i,j))]. \quad (24)$$

In an embodiment a "multipath" angle $\theta(i,j)_{MP}$ may be defined so that $$\tan\theta(i,j)_{MP} = \Sigma_{i'j'}r(i,j,i',j')\sin(\Delta\varphi(i,j,i',j'))/(1 + \Sigma_{i'j'}r(i,j,i',j')\cos(\Delta\varphi(i,j,i',j'))). \quad (25)$$

In terms of angle $\theta(i,j)_{MP}$, expression (24) for voltage $V_k(i,j,\Psi_k)$ that pixel p(i,j) provides responsive to direct and multipath light from feature f(i,j) may be written, $$V_k(i,j,\Psi_k) 32 \ A^*(i,j) + B(i,j)^*(\cos(\Psi_k + \theta(i,j)_{MP} + \varphi_d(i,j)), \quad (26)$$

where the phase delay coefficient $$B(i,j)^* = B(i,j)\sqrt{\{(1 + \Sigma_{i'j'}r(i,j,i',j')\cos(\Delta\varphi(i,j,i',j')))^2 + \Sigma_{i'j'}r(i,j,i',j')\sin(\Delta\varphi(i,j,i',j'))^2\}}. \quad (27)$$

It is convenient for presentation to define a propagation phase delay $\Theta(i,j)$, which may be referred to as a compound propagation phase delay or compound phase delay, for which $$\Theta(i,j) = \theta(i,j)_{MP} + \varphi_d(i,j). \quad (28)$$

Using expression (26) for $V_k(i,j,\Psi_k)$, $\Theta(i,j)$ may be determined from an expression, $$\Theta(i, j) \equiv (\theta(i, h)_{MP} + \varphi_d(i, j)) = \atan\left[-\sum_{k=1}^{k=K} V_k(i, j, \psi_k)\sin\psi_k \bigg/ \sum_{k=1}^{k=K} V_k(i, j, \psi_k)\cos\psi_k\right] \quad (29)$$

and $B(i,j)^*$ may be determined from an expression $$B(i,j)^{*2} = \{[(\Sigma_k V_k(i,j,\Psi_k)\sin\Psi_k)]^2 + [(\Sigma_k V_k(i,j,\Psi_k)\cos\Psi_k)^2]\}(2/K)^2, \quad (30)$$

where, as noted above 1≤k≤K.

It is noted that in the absence of MPI, multipath angle $$\theta(i,j)_{MP} = 0, \quad (31)$$

compound phase delay $$\Theta(i,j) = \theta(i,j)_{MP} + \varphi_d(i,j) = \varphi_d(i,j), \quad (32)$$

and, $$B(i,j)^* = B(i,j). \quad (33)$$

In the presence of MPI, equations (29), (30), and (31), are not satisfied.

In an embodiment, controller 225 of CW-TOF camera 200 is configured to control the camera to acquire frames of photosensor 22 useable to provide a plurality of M range images of the scene, each m-th range image, $1 \leq m \leq M$ acquired with illumination by light from light source 24 at a different modulation frequency $\omega_m$ provided by oscillator 26. Optionally, CW-TOF camera 200 is calibrated so that for a same feature in a scene the pixel that images the feature registers a same amount of light from the feature for a same intensity of illumination for each of the modulation frequencies. For each of the M range images, controller 225 determines values for $\Theta(i,j)$ and/or $B(i,j)^*$ and uses the values to provide an indication of the presence of MPI in a range image of the scene that CW-TOF camera 200 acquires. For an m-th range image of the M range images let the propagation phase delay $\varphi_d(i,j)$ be denoted by $\varphi_d(i,j,\omega_m)$, multipath angle $\theta(i,j)_{MP}$ by $\theta(i,j,\omega_m)_{MP}$, compound phase delay $\Theta(i,j)$ by $\Theta(i,j,\omega_m)$, phase delay coefficient $B(i,j)^*$ by $B(i,j,\omega_m)^*$, and voltage $V_k(i,j,\Psi_k)$ in a frame of photosensor 22 by $V_k(i,j,\Psi_k,\omega_m)$.

In an embodiment, to determine presence of MPI controller 225 processes each of the M range images to identify pixels $p(i,j)$, which may be referred to as "clean" pixels, that may be considered to provide images of respective features $f(i,j)$ of the scene that are relatively uncontaminated by MPI. The controller may determine an average $B_{avg}(i,j,\omega_m)^*$ of the phase delay coefficients $B(i,j,\omega_m)^*$ for the clean pixels and normalize all the phase delay coefficients $B(i,j,\omega_m)^*$ in an m-th image so that each pixel $p(i,j)$ is associated with a normalized phase delay coefficient $\mathcal{B}(i,j,f_m)^* = B(i,j,\omega_m)^*/B_{avg}(i,j,\omega_m)^*$. Normalized phase delay coefficients $\mathcal{B}(i,j,\omega_m)^*$ may be less susceptible than $B(i,j,\omega_m)^*$ to error generated by fluctuations in operating parameters of camera 20, such as intensity of light transmitted by light source 24, sensitivity of pixels 23 in photosensor 22 and operating temperature of the camera. The normalized phase delay coefficients $\mathcal{B}(i,j,\omega_m)^*$, because of their relatively improved resistance to error are advantageously used as described below to determine presence of MPI in voltages $V_k(i,j,\Psi_k,\omega_m)$ and corresponding propagation phase delays provided by a pixel $p(i,j)$, in accordance with an embodiment of the disclosure.

Optionally, pixels associated with relatively large values of phase delay coefficients $B(i,j,\omega_m)^*$ are considered to be clean pixels and the phase delay coefficients that they provide used to provide $B_{avg}(i,j,\omega_m)^*$ for normalizing the $B(i,j,\omega_m)^*$ of the m-th image. Pixels $p(i,j)$ that exhibit relatively large values of $B(i,j,\omega_m)^*$ are exposed to and register relatively large amounts of reflected light from features $f(i,j)$ that they respectively image. MP light that reaches a pixel $p(i,j)$ from a feature $f(i,j)$ in a scene undergoes more reflections and travels over a larger propagation path to the pixel than direct light that reaches the pixel from the feature. As a result, MP light reaching a pixel $p(i,j)$ from a feature $f(i,j)$ that the pixel images is generally characterized by relatively low intensity. Therefore if a pixel registers a relatively large amount of reflected light from a feature that it images, a portion of the registered light due to MP light is expected to be small and the registered light expected to be relatively free of MPI.

In an embodiment, to determine which pixels that provide an m-th range image exhibit values for $B(i,j,\omega_m)^*$ sufficiently large for the pixels to be considered clean, controller 225 may process the $B(i,j,\omega_m)^*$ provided by the pixels to determine a standard deviation $\sigma_B(\omega_m)$ of their magnitude.

Optionally, the controller determines that pixels for which $B(i,j,\omega_m)^*$ is within $n\sigma_B(\omega_m)$ of a maximum $B(i,j,\omega_m)^*$ for the image, where n is an integer, are determined to be clean pixels. By way of example, in an embodiment n may advantageously be equal to 2 or 3.

For a given pixel $p(i,j)$ controller 225 may determine a probability, $\mathcal{P}(i,j)$, based on values of $\Theta(i,j,\omega_m)$ and/or $B(i,j,\omega_m)^*$, $1 \leq m \leq M$, which the pixel provides, that a propagation phase delay $\varphi_d(i,j)$ and a corresponding range $d(i,j,\omega_m)$ for a feature $f(i,j)$ imaged on the pixel in the M images is relatively uncontaminated by MPI. In an embodiment, $\mathcal{P}(i,j)$ may be based on at least one function of the $\Theta(i,j,\omega_m)$ and/or the $\mathcal{B}(i,j,\omega_m)^*$. Optionally, the at least one function comprises at least one compound phase delay ratio $R\Theta(i,j,\omega_m,\omega_{m'})$ optionally equal to a ratio $\Theta(i,j,\omega_{m'})/\Theta(i,j,\omega_m)$ between compound phase delays determined for the pixel for range images acquired at different modulation frequencies $\omega_m$ and $\omega_{m'}$. In the absence of MPI, $R\Theta(i,j,\omega_m,\omega_{m'})$ is expected to be substantially equal to $\omega_{m'}/\omega_m$. Optionally, the at least one function comprises at least one phase delay coefficient ratio $R\mathcal{B}(i,j,\omega_m,\omega_{m'})$ which may be equal to a ratio $\mathcal{B}(i,j,\omega_{m'})^*/\mathcal{B}(i,j,\omega_m)^*$ between normalized phase delay coefficients for the pixel for images at different modulation frequencies $\omega_m$ and $\omega_{m'}$. In the absence of MPI, $R\mathcal{B}(i,j,\omega_m,\omega_{m'})$ is expected to be substantially equal to 1.

In an embodiment, $\mathcal{P}(i,j)$, may be based on standard deviations determined for a value or values of $\Theta(i,j,\omega_m)$ and/or $\mathcal{B}(i,j,\omega_m)^*$ that pixel $p(i,j)$ provides. The standard deviations may be based on measurements of variability in values $\Theta(i,j,\omega_m)$ and/or $\mathcal{B}(i,j,\omega_m)^*$ that the pixel provides in the absence of MPI and/or in the presence of known MPI, and/or on variability of the values as functions of amounts of light that the pixel registers.

By way of example, in an embodiment, $\mathcal{P}(i,j)$ may comprise a multivariate Gaussian density function dependent on a vector $VR\Theta(i,j,\omega_m,\omega_{m'}) \equiv (R\Theta(i,j,\omega_1,\omega_2), R\Theta(i,j,\omega_1,\omega_3), \ldots R\Theta(i,j,\omega_1,\omega_M))$ and/or on a vector $VR\mathcal{B}(i,j,\omega_m,\omega_{m'}) \equiv (R\mathcal{B}(i,j,\omega_1,\omega_2), R\mathcal{B}(i,j,\omega_1,\omega_3), \ldots, R\mathcal{B}(i,j,\omega_1,\omega_M))$. In the absence of MPI, $VR\Theta(i,j,\omega_m)$ is expected to be substantially equal to a vector $VR\omega \equiv (\omega_2/\omega_1), (\omega_3/\omega_1), \ldots, \omega_M/\omega_1)$ and $VR\mathcal{B}(i,j,\omega_m,\omega_{m'})$ to be equal to the unit vector 1. If a vector $X((i,j)$ is defined as a concatenation of vectors $VR\Theta(i,j,\omega_m,\omega_{m'})$ and $VR\Theta(i,j,\omega_m)$, and a vector $\mu((i,j)$ as a concatenation of vectors $VR\omega$ and $1z$,901 $(i,j)$ may be defined, $$\mathcal{P}(i,j) = \exp((-1/2)(X((i,j) - \mu((i,j))^T \Sigma^{-1}(X((i,j) - \mu((i,j)))/\sqrt{|2\pi\Sigma|}, \quad (34)$$

where T indicates the transpose vector, $\Sigma$ is the covariance matrix of $X((i,j)$, and $|2\pi\Sigma| \equiv \det \Sigma$.

By way of another example for which the number of range images M is optionally equal to 3 and the images are acquired at frequencies $\omega_1$, $\omega_2$, and $\omega_3$, a probability that a pixel $p(i,j)$ imaging a feature $f(i,j)$ is affected by MPI may be determined based on a phase delay ratio, $$R\Theta(i,j,\omega_1,\omega_2,\omega_3) = [\omega_1/(\omega_2+\omega_3)][(\Theta(i,j,\omega_2)+\Theta(i,j,\omega_3))/\Theta(i,j,\omega_1)] \quad (35)$$

and a phase delay coefficient ratio $$R\mathcal{B}(i,j,\omega_1,\omega_2,\omega_3) = 0.5(\mathcal{B}(i,j,\omega_2)^* + \mathcal{B}(i,j,\omega_3)^*)/\mathcal{B}(i,j,\omega_1)^*. \quad (36)$$

In the absence of MPI $R\Theta(i,j,\omega_1,\omega_2,\omega_3) = R\mathcal{B}(i,j,\omega_1,\omega_2,\omega_3) = 1$ and a probability that images of a features $f(i,j)$ in a scene that pixel $p(i,j)$ provides are substantially free of MPI, may be based on values of a probability density distribution, $$\mathcal{P}(i,j) = \exp((-1/2)(X((i,j))-1)^T \Sigma^{-1}(X((i,j))-1))/\sqrt{|2\pi\Sigma|}, \quad (37)$$

where $X((i,j)) = R\Theta(i,j,\omega_1,\omega_2,\omega_3) || (i,j,\omega_1,\omega_2,\omega_3),$ (38)

and || is the concatenation symbol.

In an embodiment of the disclosure, for the M=3 range images, a probability that images pixel p(i,j) provides of a feature in a scene are substantially free of MPI, may be based on a function of weighted values for $R\Theta(i,j,\omega_1,\omega_2,\omega_3)$ and $R\mathcal{B}(i,j,\omega_1,\omega_2,\omega_3)$. If the function of the weighted values is represented by $\mathcal{W}(i,j,w_\Theta + \omega\mathcal{B})$, optionally $$\mathcal{W}(i,j,w_\Theta, w\mathcal{B}) = 1 - \{w_\Theta | 1-(R\Theta(i,j,\omega_1,\omega_2,\omega_3))| + w_{z,32}$$
$$|1 - R\mathcal{B}(i,j,\omega_1,\omega_2\omega_3)|\} \quad (39)$$

where the weighting factors satisfy $w_\Theta + w\mathcal{B} = 1$.

In general $R\mathcal{B}(i,j\omega_1, \omega_2, \omega_3)$ exhibits greater sensitivity to MPI than $R\Theta(i,j,\omega_1,\omega_2,\omega_3)$ and in an embodiment it may be advantageous that the weighting factors satisfy the relation $w\mathcal{B} > w_\Theta$. For example, in an embodiment, $w\mathcal{B}$ may be equal to 0.7 and $w_\Theta$ equal to 0.3.

FIG. 3 shows a flow diagram 300 of a method by which controller 25 may control CW-TOF camera 20 to determine whether a compound propagation phase delay $\Theta(i,j,\omega_m)$, $1 \leq m \leq M$, based on photocharge accumulated by a pixel p(i,j) is contaminated by MPI or may be considered substantially uncontaminated, and equal to a propagation delay $\varphi_d(i,j,\omega_m)$ resulting from a round trip time $t_R$ for light to travel from light source 24 to a feature f(i,j) imaged on the pixel.

In a block 301 the controller may set index m, $1 \leq m \leq M$, equal to 0, and in a block 303 increase the index by 1. Optionally in a block 305 controller 25 controls CW-TOF camera 20 to illuminate a scene that the camera images with light modulated at modulation frequency $\omega_m$ for each of a plurality of K sampling phase shifts $\Psi_k$, $1 \leq k \leq K$. In a block 307 the camera may image light reflected by features f(i,j) in the scene on pixels p(i,j) respectively to accumulate photocharge responsive to the reflected light, and determine corresponding voltages $V_k(i,j,\Psi_k,\omega_m)$ referred to in paragraph [0030] above. In a block 309 controller 25 may process voltages $V_k(i,j\Psi_k,\omega_m)$ to determine for each pixel a respective phase delay coefficient $B(ij,\omega_m)^*$ and a compound phase delay $\Theta(i,j,\omega_m)$. In a block 311 the controller may process the $B(i,j,\omega_m)^*$ to determine, optionally as described above in paragraph [0032] and [0033], which pixels p(i,j) are candidates for being "clean" pixels that are relatively free of MPI. In a block 313 the controller may use the $B(i,j,\omega_m)^*$ associated with clean pixels to normalize the $B(i,j,\omega_m)^*$, to determine respective normalized values $\mathcal{B}(i,j,\omega_m)^*$ optionally in accordance with the description in paragraph [0031]. In a decision block 315 controller 25 determines whether m is equal to M. If m is not equal to M, controller 25 returns to block 303 to increase m by 1 and repeat actions performed in blocks 305 to 315.

If on the other hand controller 25 determines in decision block 315 that m is equal to M, the controller optionally proceeds to a block 317. In block 317 the controller optionally uses a set of values $\{\mathcal{B}(i,j,\omega_m)^* | 1 \leq m \leq M\}$ and or a set of values $\{\Theta(i,j,\omega_m) | 1 \leq m \leq M\}$ to determine for a pixel p(i,j) whether a compound propagation phase delay $\Theta(i,j,\omega_m)$ and a corresponding distance $d(i,j,\omega_m)$ for a given modulation frequency $\omega_m$ is degraded by MPI.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A continuous wave time of flight (CW-TOF) range camera comprising:
   a light source operable to transmit light to illuminate a scene that the camera images;
   a photosensor having pixels configured to register amounts of light reflected by features in the scene from the transmitted light; and
   a controller configured to:
   control the light source to illuminate the scene with light modulated at each of a plurality of M different modulation frequencies $\omega_m$, $1 \leq m \leq M$;
   for each $\omega_m$ acquire frames of the photosensor that image the scene and provide for each pixel of the plurality of pixels a voltage useable to provide a range image of the scene;
   for a given pixel p(i,j) and for each $\omega_m$ process the frames to determine a propagation phase delay $\Theta(i,j,\omega_m)$ and a phase delay coefficient $B(i,j,\omega_m)^*$ associated with the voltages that the frames provide for the given pixel; and
   use $\Theta(i,j,\omega_m)$ and/or $B(i,j,\omega_m)^*$ for at least two different $\omega_m$ to determine whether $\Theta(i,j,\omega_m)$ is degraded by multipath interference (MPI).

2. The CW-TOF range camera according to claim 1 wherein to use $\Theta(i,j,\omega_m)$ for different $\omega_m$ the controller is configured to determine a ratio $R\Theta(i,j,\omega_1,\omega_2)$ that is dependent on $\Theta(i,j,\omega_m)$ evaluated for each of at least two different frequencies $\omega_1$ and $\omega_2$ of the plurality of frequencies.

3. The CW-TOF range camera according to claim 2 wherein $R\Theta(i,j,\omega_1,\omega_2)$ comprises $\Theta(i,j,\omega_2)/\Theta(i,j,\omega_1)$.

4. The CW-TOF range camera according to claim 3 wherein the controller is configured to determine whether $\Theta(i,j,\omega_m)$ is degraded by MPI based on comparing $R\Theta(i,j,\omega_1,\omega_2)$ to $\omega_2/\omega_1$.

5. The CW-TOF range camera according to claim 4 wherein comparing $R\Theta(i,j,\omega_1,\omega_2)$ to $\omega_2/\omega_1$ comprises determining a value for a probability function that is a function of $R\Theta(i,j,\omega_1,\omega_2)$ and $\omega_2/\omega_1$.

6. The CW-TOF range camera according to claim 2 wherein $M \geq 3$ and $R\Theta(i,j,\omega_1,\omega_2) = [\omega_1/(\omega_2+\omega_3)][(\Theta(i,j,\omega_2) + (\Theta(i,j,\omega_3))/\Theta(i,j,\omega_1)]$.

7. The CW-TOF range camera according to claim 6 wherein the controller is configured to determine whether $\Theta(i,j,\omega_m)$ is degraded by MPI based on comparing $R\Theta(i,j,\omega_1,\omega_2)$ to 1.

8. The CW-TOF range camera according to claim 7 wherein comparing $R\Theta(i,j,\omega_1,\omega_2)$ to 1 comprises determining a value for a probability function that is a function of $R\Theta(i,j,\omega_1,\omega_2)$ and 1.

9. The CW-TOF range camera according to claim 1 wherein to use $B(i,j,\omega_m)^*$ for different $\omega_m$ the controller is configured to determine a ratio $RB(i,j,\omega_1,\omega_2)$, that is dependent on $B(i,j,\omega_m)^*$ evaluated for each of at least two different frequencies, $\omega_1$ and $\omega_2$ of the plurality of frequencies.

10. The CW-TOF range camera according to claim 9 wherein $RB(i,j,\omega_1,\omega_2)$ is a function of $B(i,j,\omega_2)^*/B(i,j,\omega_1)^*$.

11. The CW-TOF range camera according to claim 10 wherein the controller is configured to determine whether $\Theta(i,j,\omega_m)$ is degraded by MPI based on comparing $RB(i,j,\omega_1,w_2)^*$ with 1.

12. The CW-TOF range camera according to claim 11 wherein comparing $RB(i,j,\omega_1,\omega_2)$ to 1 comprises determining a value for a probability function that is a function of $RB(i,j,\omega_1,\omega_2)$ and 1.

13. The CW-TOF range camera according to claim 9 wherein $M \geq 3$ and $RB(i,j,\omega_1,\omega_2)^*=0.5(B(i,j,\omega_2)^*+B(i,j,\omega_3)^*)/B(i,j,\omega_1)^*$.

14. The CW-TOF range camera according to claim 13 wherein the controller is configured to indicate whether $\Theta(i,j,\omega_m)$ is degraded by MPI based on comparing $RB(i,j,\omega_1,\omega_2)$ with 1.

15. The CW-TOF range camera according to claim 14 wherein comparing $RB(i,j,\omega_1,\omega_2)$ to 1 comprises determining a value for a probability function that is a function of $RB(i,j,\omega_1,\omega_2)$ and 1.

16. The CW-TOF range camera according to claim 9 wherein determining $RB(i,j,\omega_1,\omega_2)$ comprises:
    determining a selection of pixels $p(i',j')$ of the plurality of pixels in the photosensor that are relatively free of MPI;
    determining an average of phase delay coefficients $B(i',j',\omega_1)^*$ for pixels in the selection;
    normalizing $B(i,j,\omega_1)^*$ to the average; and
    using the normalized $B(i,j,\omega_1)^*$ in place of $B(i,j,\omega_1)^*$ to determine $RB(i,j,\omega_1,\omega_2)$.

17. The CW-TOF range camera according to claim 16 wherein a pixel $p(i',j')$ is determined to be relatively free of MPI if a value of the phase delay coefficient $B(i',j',\omega_1)^*$ for the pixel is relatively large.

18. The CW-TOF range camera according to claim 17 wherein determining whether the phase delay coefficient $B(i',j',\omega_1)^*$ for pixel $p(i',j')$ is relatively large comprises:
    determining a maximum and a standard deviation $\sigma_B(\omega_1)$ for the magnitudes of the phase delay coefficients for the pixels in the photosensor at frequency $\omega_1$;
    determining that the phase delay coefficient $B(i',j',\omega_1)^*$ for a pixel $p(i',j')$ of the plurality of pixels in the photosensor is relatively large if it is within $n\sigma_B(\omega_m)$ of the determined maximum phase delay coefficient, where n is an integer.

19. A method for determining whether a distance that a continuous wave time of flight (CW-TOF) range camera provides for a scene that the camera images is degraded by multipath interference (MPI), the method comprising:
    transmitting light modulated at each of a plurality of M different modulation frequencies $\omega_m$, $1 \leq m \leq M$ to illuminate the scene;
    for each $\omega_m$ determining voltages based on photocharge that the camera accumulates responsive to light reflected by the scene from light transmitted at $\omega_m$;
    processing the voltages for each $\omega_m$ to determine a propagation phase delay $\Theta(\omega_m)$ and a phase delay coefficient $B(\omega_m)^*$ that characterize the determined voltages; and
    using the $\Theta(\omega_m)$ and/or $B(\omega_m)^*$ determined for at least two different $\omega_m$ to determine whether a phase delay $\Theta(\omega_{m'})$ $1 \leq m' \leq M$ and thereby the distance is degraded by multipath interference (MPI).

20. The method according to claim 19 wherein using the $\Theta(\omega_m)$ and/or $B(\omega_m)^*$ for different $\omega_m$ comprises determining a ratio $R\Theta(\omega_1,\omega_2)$ that is dependent on $\Theta(\omega_m)$ and/or determining a ratio $RB(\omega_1,\omega_2)$ that is dependent on $B(\omega_m)^*$, evaluated for each of at least two different frequencies $\omega_1$ and $\omega_2$ of the plurality of frequencies.

* * * * *